United States Patent [19]
Whisenant

[11] Patent Number: 5,555,675
[45] Date of Patent: Sep. 17, 1996

[54] PLANT CULTIVATION APPARATUS AND METHOD

[76] Inventor: Blake Whisenant, P.O. Box 207, Hwy. 62, Parrish, Fla. 34219

[21] Appl. No.: 479,636

[22] Filed: Jun. 7, 1995

Related U.S. Application Data

[63] Continuation-in-part of Ser. No. 315,501, Sep. 30, 1994, which is a continuation of Ser. No. 976,351, Nov. 17, 1992, Pat. No. 5,379,547, which is a continuation-in-part of Ser. No. 546,448, Jul. 2, 1990, Pat. No. 5,193,306.

[51] Int. Cl.$^6$ ..................................................... A01G 9/02
[52] U.S. Cl. .................................................. 47/79; 47/66
[58] Field of Search ............................... 47/62 C, 66 B, 47/79 D, 81 D, 62, 62 N, 62 E

[56] References Cited

U.S. PATENT DOCUMENTS

| 3,683,548 | 8/1972 | Hagerty | 47/81 D |
| 4,287,682 | 9/1981 | Browne | 47/66 B |

FOREIGN PATENT DOCUMENTS

| 2230170 | 10/1990 | United Kingdom | 47/62 C |
| 2265292 | 9/1993 | United Kingdom | 47/62 C |

Primary Examiner—Terry Lee Melius
Assistant Examiner—Joanne C. Downs
Attorney, Agent, or Firm—Cushman Darby & Cushman, L.L.P.

[57] ABSTRACT

An apparatus and method for conserving water and reducing labor in growing plants includes a reservoir container assembly having a box-like, watertight base including a dividing wall extending the length of the base; on one side of the dividing wall water is stored and on the opposite side of the wall, soil is deposited with apertures being provided in the dividing wall to allow moisture to pass to the soil; a screen barrier overlies at least the water reservoir portion of the base and a truncated pyramidal shaped cover is located over the base having a reduced area opening at the top for enclosing soil which is in contact with the soil in the soil chamber at the base; a flexible container bag having apertures therein is provided to cover the opening at the top of the truncated pyramidal cover and to reduce loss of moisture through evaporation; plants are deposited or seeds inserted in the soil to an appropriate depth adjacent the opening in the cover.

12 Claims, 2 Drawing Sheets

PLANT CULTIVATION APPARATUS AND METHOD

This application is a Continuation-in-Part of application Ser. No. 08/315,501, filed Sep. 30, 1994, which is a continuation of Ser. No. 07/976,351, filed Nov. 17, 1992, and now U.S. Pat. No. 5,379,547, which is a continuation-in-part of Ser. No. 546,448, filed Jul. 2, 1990, and now U.S. Pat. No. 5,193,306.

FIELD OF THE INVENTION

The present invention relates to a further improvement to the plant cultivation apparatus and method of my earlier patents identified above and one which further minimizes the quantity of water and the amount of labor required to grow plants to maturity in a container which sits above the ground, but which may be exposed to the outside atmosphere or used in a greenhouse environment.

BACKGROUND OF THE INVENTION

A number of efforts have been employed by plant cultivators and, particularly, those who cultivate specific types of plants of either an exotic nature or plants for which the return on investment or demand is sufficiently high or above that of normal field crops which are typically subject to the uncertainties of rainfall and severe weather.

In certain areas of the world, where the temperature is relatively moderate or of an elevated temperature sufficient to foster plant growth most or all of the year, water supply has often limited agricultural development. In other areas such as the southern states of the United States, population growth has increased the demand for potable water, thus giving rise to severe competition between farm and non-farm as well as residential interests. Accordingly, a number of proposals such as those in my above-identified prior patents and pending application, a cultivation apparatus has been proposed and has been successfully employed to grow plants and crops that are sensitive to soil quality and hydration while reducing the quantity of water required. While successful for their intended purpose, it has been found that further improvements in terms of water conservation and distribution of nutrients in each container is required in order to enhance the efficiency of the operation to be financially beneficial to the cultivator.

SUMMARY OF THE INVENTION

The present invention provides a significant improvement in terms of water conservation and plant development while decreasing the cost of the enclosure. Specifically, in a preferred embodiment, a container is provided with a base enclosure which is preferably water-tight and has a bottom wall that is level to facilitate placement on the surface of the ground. A peripheral edge is provided spaced from the bottom wall and a truncated pyramidal wall structure is superimposed on the peripheral edge of the base enclosure. The base enclosure is provided with a dividing wall to separate a water reservoir from a soil chamber. The truncated pyramidal structure also encloses growing soil medium while the open top portion is closed with a flexible bag containing a fertilizer material. Since the side walls of the truncated pyramidal structure slope from the larger dimensioned base enclosure towards the opening at the top of the pyramidal structure, support is provided for posts which will support strings or cords which may be extended into the soil medium through the fertilizer bag container to facilitate growth of specific plant types. The fertilizer bag is provided with small openings through which the plant will grow.

As in my previous arrangements, the opening about a plant stem will be kept as small as possible to prevent or at least to minimize evaporation of water at this site. Maintaining the tight fit is easily effected by making the opening sufficiently small so that, as the stem increases in diameter, stem contact with the peripheral edge of the opening is maintained. By making the fertilizer bag material of a thin, flexible sheet material, adequate contact with the stem will be maintained.

With this arrangement, the container assembly of the present invention may be left unattended for several days or longer before the reservoir will require replenishment. Indeed, it has been found that evaporation to the atmosphere through the openings in the fertilizer bag will be reduced significantly so that through a planting season, a water saving of 60% will be achieved over open container cultivation.

The foregoing and other advantages of the present invention will become apparent as detailed consideration is given to the following detailed description taken in conjunction with the accompanying drawings, in which:

DETAILED DESCRIPTION OF THE INVENTION

Figure 1:
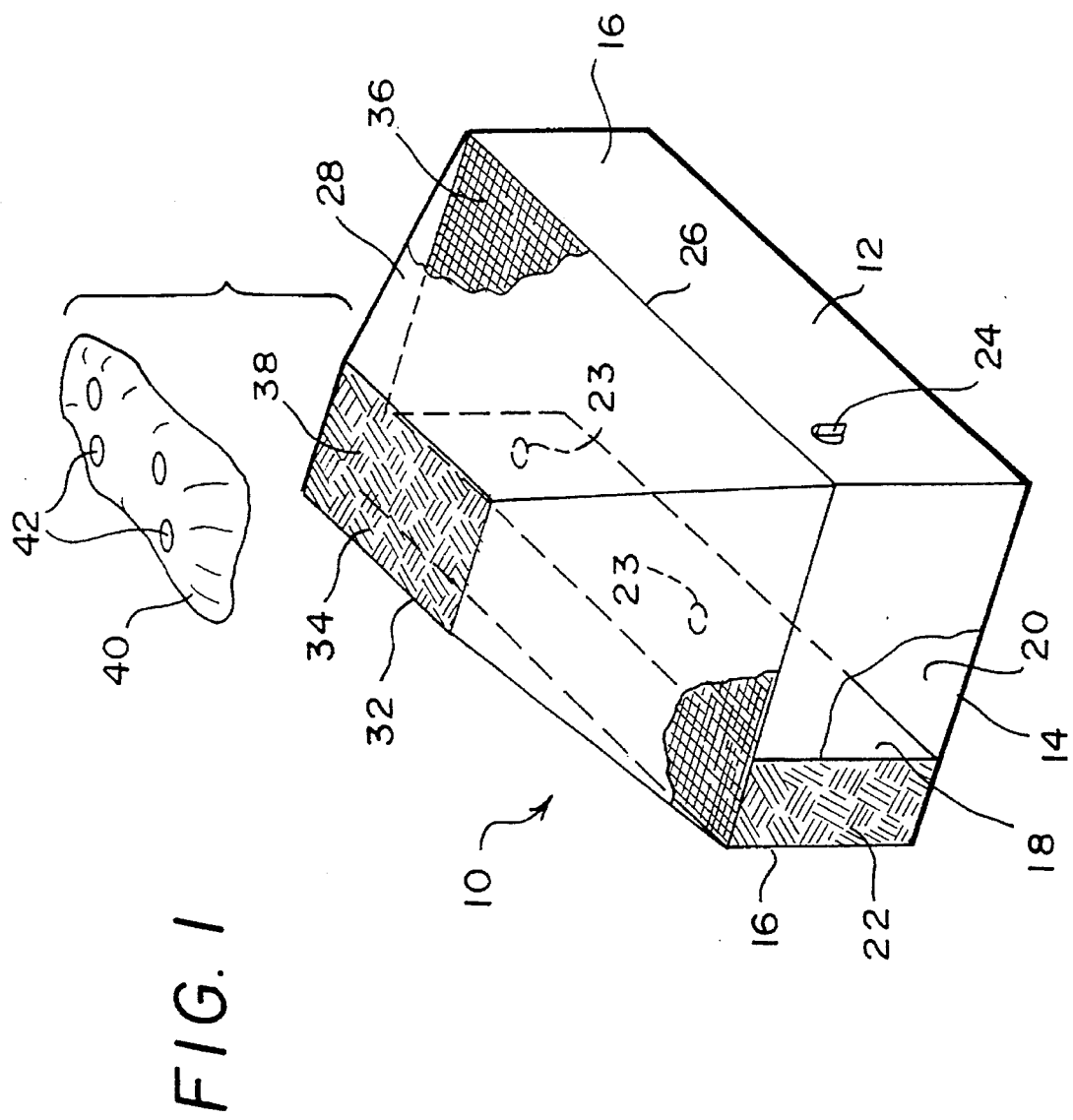
FIG. 1 is a perspective view of the reservoir container of the present invention.

Referring now to the drawings, there is shown in FIG. 1 a reservoir container 10 of the present invention and which includes a generally rectangular base enclosure 12 which preferably has a flat bottom wall 14. The peripheral side walls, such as at 16, will preferably extend perpendicularly from the edges of the base wall 14. It has been found that the base enclosure 12 is preferably made from a high strength plastic material due to the normally rugged handling that is experienced in the field. Polyethylene containers are ideally suited for this use.

The interior of the base enclosure 12 is provided with a dividing wall 18 which extends the length of the container and has its edges preferably sealed to the contacting surfaces of the base enclosure 12. Preferably, the dividing wall 18 is located closer to one of the side walls 16 than the opposite side wall to provide an enlarged reservoir enclosure 20 for containing water. On the opposite side of dividing wall 18 is a soil enclosing chamber 22. One of the side walls 16 of the base enclosure 12 may be provided with a filling opening 24 which includes a openable plug to facilitate loading a liquid such as water into the reservoir 20 of the base enclosure 12.

The upper peripheral edge 26 of the base enclosure 12 is surmounted by a truncated pyramidal wall structure 28 which may be made of the same material as the base enclosure 12. If desired, the lower edges 30 of the structure 28 may be sealed to the peripheral edge 26 of the base enclosure 12. The side walls 29 of the structure 28 may be angled to slope inwardly at an acute angle to the horizontal of approximately 55° to 65°.

The dividing wall 18 is provided with one or more drain openings 23 which will permit water from the reservoir 20 to saturate the soil in the soil chamber 22.

The uppermost peripheral edge 32 of the pyramidal structure 28 surrounds an opening 34. In use, a nutrient soil may be loaded through the opening 34 up to the peripheral edge 32 of the structure 28. The base of the pyramidal structure 28 is provided with a dividing screen 36 extending over the entire upper periphery 26 of the base enclosure 12. The mesh of the screen 36 should be sufficient to prevent the soil 38 that is filled into the interior of the pyramidal structure 28 through the opening 34 from falling into the reservoir 20. In another arrangement, the screen 36 will only extend to the upper edge of the dividing wall 18 to thereby facilitate filling of the soil chamber 22 from soil deposited through the opening 34. At this time, seeds or striplings of the plants to be cultivated may be inserted into the soil 38. In some circumstances, it will be necessary and desirable to cover the opening 34 and, to this end, the present invention provides an appropriately dimensioned flexible plastic container or bag 40 which serves two functions. Firstly, the bag 40 will contain a suitable fertilizer appropriate to the crop being nurtured. Also, by correct selection of the size and flexibility of the bag 40, when placed on the opening 34, the opening essentially will be closed off to substantially reduce evaporation of water through the opening 34 to be lost to the atmosphere. To this end, the plastic bag may be made of polyethylene, polyester, nylon or the like and need not be impermeable to water. Indeed, apertures may be provided on the under side of the bag 40 that comes into contact with the surface of the soil 38 for the purpose of transferring the nutrients to the soil 38 in a controlled manner depending on the size and/or number of apertures provided.

Small openings 42 may be formed completely through the bag 40 to facilitate growth of the crop through the bag 40 over time. Preferably, the size of the openings 42 will be maintained very small initially to reduce evaporation at the site of the openings 42 for the reasons explained in my earlier U.S. Pat. No. 5,193,306.

Figure 2:
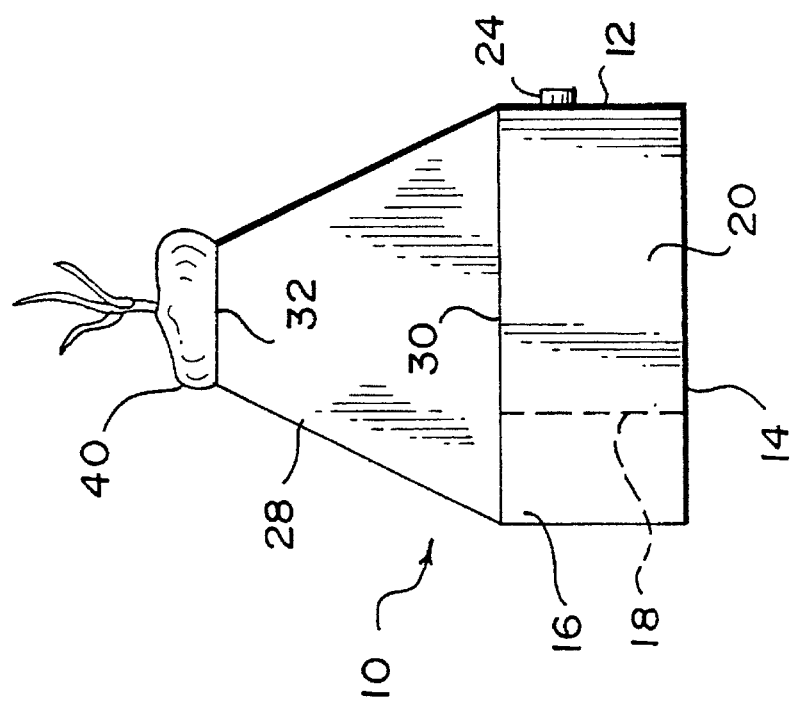
FIG. 2 is an end view in elevation of the container of FIG. 1.

As shown in FIG. 2, which is an end view of the container of FIG. 1, the reservoir container 10 is shown with plants growing through the bag 40. It will be appreciated that some plants will perforate the bag 40 and, to this end, the material of the bag should be selected so as to be easily penetrated by a growing plant.

Figure 3:
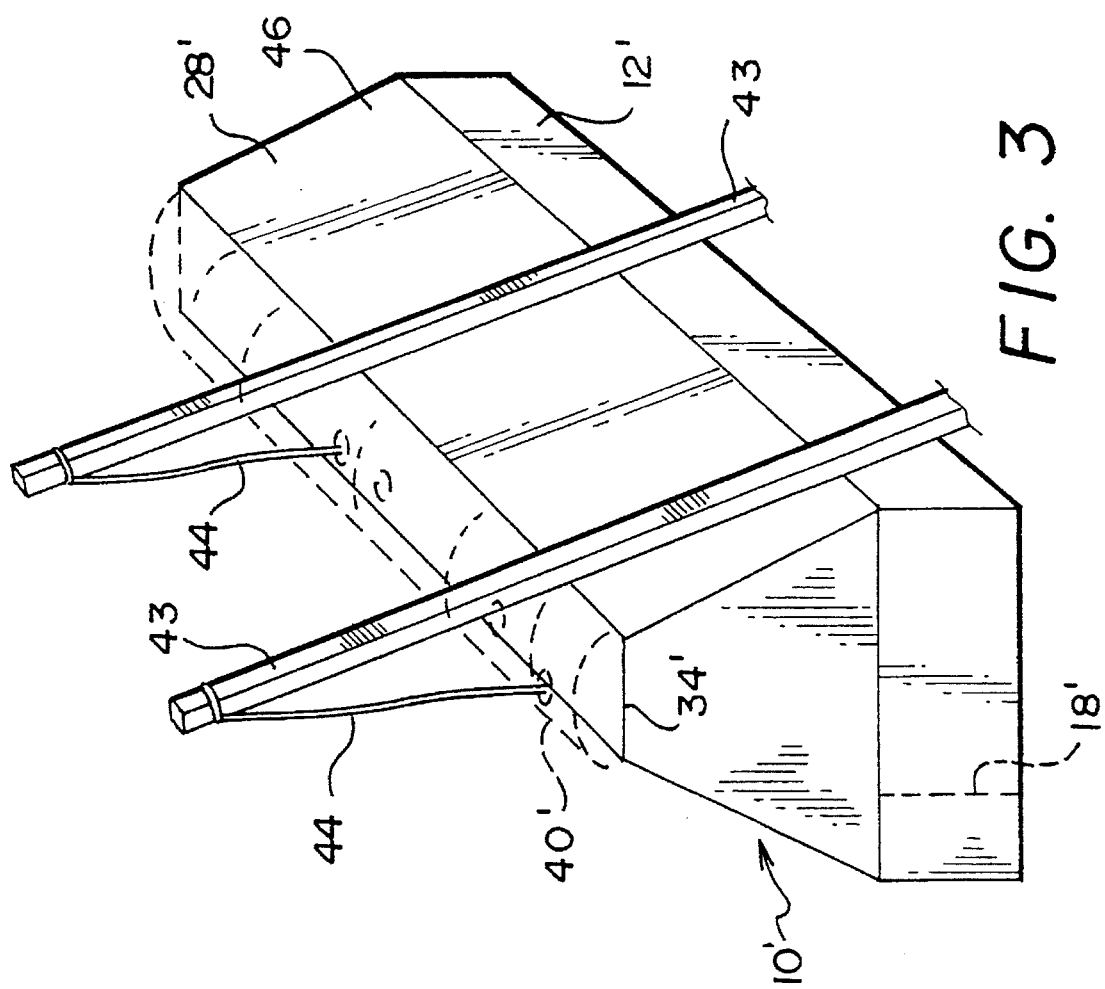
FIG. 3 is a perspective view of a modified arrangement of the container of FIG. 1.

In the embodiment of FIG. 3, parts corresponding to the embodiment of FIGS. 1 and 2 are shown with the same numerals but raised by a prime. In the FIG. 3 embodiment, an elongated container housing 12' is constructed with a correspondingly elongated upper opening 34' and a correspondingly elongated fertilizer carrying bag 40' is employed for closing the opening 34' just as in the FIG. 1 and FIG. 2 embodiments. In this arrangement, one of the sloping sidewalls 46 of the truncated pyramidal portion 28' is employed to support poles 43 from which strings 44 may be suspended to facilitate growth of clinging plants such as tomatoes. The lower end of each of the poles 43 is secured by anchoring it in or penetration of the ground. As the weight of the plant increases, the force on the cord or string 44 will be largely absorbed by the sloping sidewall 46 of the truncated pyramidal portion 28' of the reservoir container 12'.

By the combination of a reduction in the size of the uppermost opening 34 of the reservoir container 12 and by the added step of a flexible closure in the form of a bag 40 for the opening 34, a substantial increase in water conservation can be achieved over a single growing season.

As it will be apparent to those skilled in this art, various modifications may be made to the present invention without departing from the spirit and scope of the invention as defined in the following claims:

What is claimed is:

1. A plant cultivation container comprising a bottom surface and a peripheral wall extending from said bottom surface and terminating at an upper edge to thereby define an interior volume, at least one partition extending across said bottom surface and having a selected height relative to said bottom surface to divide said interior volume into a first and a second chamber, at least one wall extending from a section of said upper edge and sloping inwardly over a portion of said interior volume, said one wall including adjacent peripheral wall segments extending from the remainder of said upper edge to define an enclosure over said upper edge of said interior volume, said enclosure including an upper border defining an opening through which plants can grow when placed in soil disposed in said enclosure, said opening having a predetermined area that is less than the area bounded by said upper edge of said peripheral wall, said container including a flexible container bag having a surface dimension such that said bag will close said opening when placed thereon.

2. The invention as claimed in claim 1 wherein said one wall and said adjacent peripheral wall segments together define a truncated pyramidal enclosure.

3. The invention as claimed in claim 2 wherein said pyramidal enclosure has a lower edge that rests on said upper edge of said peripheral wall.

4. The invention as claimed in claim 1 wherein said partition includes at least one opening establishing communication between said first and second chambers.

5. The invention as claimed in claim 1 wherein said peripheral wall of said container includes a filler opening.

6. The invention as claimed in claim 1 wherein said second chamber is larger in volume than said first chamber, said first chamber including a screen barrier extending thereover and supported by said upper edge and said partition wall.

7. The invention as claimed in claim 1 wherein said bag contains a fertilizer material and includes at least one aperture for establishing communication between the contents of said bag and said enclosure.

8. The invention as claimed in claim 1 wherein said bag is provided with at least one opening extending completely therethrough.

9. The invention as claimed in claim 1 wherein said container is made from a plastic material.

10. The invention as claimed in claim 1 wherein said bag is made from a plastic material.

11. The invention as claimed in claim 10 wherein said plastic material is polyethylene.

12. A method of growing plants in a container having a base surface and a peripheral wall having an upper edge, a partition extending across said base surface to divide said container into a first and a second chamber with said partition having at least one aperture establishing communication between said chambers, a cover extending from said upper edge and including at least one wall sloping inwardly from said upper edge at a selected angle, said cover having a top opening of an area that is smaller than the area bounded by said upper edge, said first chamber having a screen barrier overlying said first chamber, comprising the steps of filling the volume enclosed by said cover with plant nutrient soil, placing one of striplings and seeds in said soil, providing a flexible container having an aperture with fertilizer and closing said top opening with the flexible container with the aperture in communication with the nutrient soil.

\* \* \* \* \*